United States Patent
Grossman et al.

(10) Patent No.: US 9,906,467 B2
(45) Date of Patent: Feb. 27, 2018

(54) INVERSE WEIGHTED ARBITRATION

(71) Applicant: D.E. Shaw Research, LLC, New York, NY (US)

(72) Inventors: J. P. Grossman, Huntington, NY (US); Brian Patrick Towles, New York, NY (US)

(73) Assignee: D.E. Shaw Research, LLC, New York, NY (US)

(*) Notice: Subject to any disclaimer, the term of this patent is extended or adjusted under 35 U.S.C. 154(b) by 38 days.

(21) Appl. No.: 14/739,177

(22) Filed: Jun. 15, 2015

(65) Prior Publication Data

US 2015/0365329 A1 Dec. 17, 2015

Related U.S. Application Data

(60) Provisional application No. 62/012,027, filed on Jun. 13, 2014.

(51) Int. Cl.
*H04L 12/933* (2013.01)
*H04L 12/801* (2013.01)

(52) U.S. Cl.
CPC ............ *H04L 49/109* (2013.01); *H04L 47/10* (2013.01)

(58) Field of Classification Search
None
See application file for complete search history.

(56) References Cited

U.S. PATENT DOCUMENTS

| | | | | |
|---|---|---|---|---|
| 2007/0168494 A1* | 7/2007 | Liu | ................. | G06Q 10/06 709/224 |
| 2014/0204764 A1* | 7/2014 | Kumar | ................. | H04L 45/302 370/241 |
| 2015/0067291 A1* | 3/2015 | Miyamoto | ............ | G06F 3/0659 711/167 |
| 2015/0295852 A1* | 10/2015 | Natarajan | ............... | H04L 47/80 709/225 |
| 2015/0372986 A1* | 12/2015 | Fountain | ............. | H04L 12/4641 726/3 |

* cited by examiner

*Primary Examiner* — Brandon Renner
(74) *Attorney, Agent, or Firm* — Occhiuti & Rohlicek LLP (57) ABSTRACT

A data communication apparatus includes a router, first and second packet producers, and a penalizer. The router is directly connected to the first and second producers. The penalizer assesses penalties against each producer whenever that producer is serviced. The penalty value depends at least in part on an expected extent to which the first producer requires service. The penalizer then accumulates penalties against each producer.

36 Claims, 4 Drawing Sheets

INVERSE WEIGHTED ARBITRATION

RELATED APPLICATIONS

This application claims the benefit of the Jun. 13, 2014 priority date of U.S. provisional application 62/012,027, the contents of which are herein incorporated by reference.

FIELD OF INVENTION

This application relates to resource allocation, and in particular, to equitable allocation of computing resources among competing entities.

BACKGROUND

In many computer systems, entities compete for use of a particular resource. A goal in some such systems is to provide equality of service among the competing entities.

A known way to allocate a resource among such competing entities is to provide each entity with equal time using the resource. This may result in locally fair arbitration of the resource. However, locally fair arbitration can result in unfairness at the global level.

A known way to overcome this difficulty is to dynamically observe demands made by the competing entities and to adjust resource allocation accordingly. Another known way is to allocate a resource on the basis of waiting times associated with each competing entity. However, these schemes introduce additional overhead.

SUMMARY

In one aspect, the invention features an apparatus for data communication. Such an apparatus includes a router, a plurality of packet producers, each of which is directly connected to the router, and a penalizer. Although there can be any number of packet producers, the invention is best understood, without loss of generality, by considering the operation with a first packet producer and a second packet producer, or with first, second, and third packet producers. The penalizer assesses a first penalty against the first packet producer when the router services the first packet producer. Similarly, it assesses a second penalty against the second packet producer when the router services the second packet producer. The first and second penalties have values that depend at least in part on expected extents to which the first and second packet producers require service. The penalizer then combines the penalty assessed against the first packet producer with an accumulated penalty for the first packet producer. Similarly, the penalizer combines the penalty assessed against the second packet producer with an accumulated penalty for the second packet producer. The invention is described herein in terms of only a few packet producers for ease of exposition. The operation and structure would be the same for any number of packet producers, or, more generally, any number of entities that seek access to a finite resource.

Some embodiments also include a network in which the data communication takes place. Among these are embodiments in which the entire network is integrated into a chip, those in which the entire network is distributed across, and integrated into, plural chips, those in which parts of the network are integrated into one or more chips, and those in which the network is not integrated at all.

Some embodiments include an arbiter that is configured to award priority to a packet producer based at least in part on the accumulated penalty for the first packet producer and on the accumulated penalty for the second packet producer. Among these are embodiments in which the arbiter is configured to cause penalty values that are greater than a threshold to become less than the threshold when a request has been received from a producer having a penalty accumulator whose value is above the threshold but no request has concurrently been received from a producer having a penalty accumulator whose value is below the threshold.

Also among the embodiments that include such an arbiter are those in which the packet producers are divided among upper and lower rungs of a penalty ladder that can have two or more rungs. In these embodiments, packet producers are placed on rungs based on their accumulated penalties. For example, a packet producer is on the upper rung if an accumulated penalty associated with the producer is in excess of a threshold. Conversely, a packet producer is on the lower rung if an accumulated penalty associated with the producer is less than the threshold. The arbiter is programmed or otherwise configured to award priority to a producer on the lower rung when possible. A variety of methods can be used to select a particular packet producer from those on the lower rung. In one particular embodiment, the arbiter does so by using round-robin arbitration.

As noted above, the penalty ladder is not restricted to two rungs. For example, the penalty ladder can have three or more rungs, each one of which is associated with a range of penalty values. In these embodiments, the packet producers are divided among the rungs based on their accumulated penalties. In particular, a packet producer is on a particular rung if an accumulated penalty associated with the producer is within a range of penalty values associated with the particular rung. In these embodiments, the arbiter preferentially services penalty accumulators in the lowest rung that has penalty accumulators in it, and then services penalty accumulators in each of the next highest occupied rung, an occupied rung being one that has at least one penalty accumulator in it. The arbiter does so in order from the lowest occupied rung to the highest occupied rung. In these embodiments, the arbiter uses any number of schemes for selecting a particular producer within a rung. In some embodiments, it uses round-robin arbitration to select a particular producer from among a plurality of producers on one of the rungs. Also among these embodiments are those in which each rung has an associated threshold, and the arbiter uses round-robin arbitration to select a particular producer from among a plurality of producers on a rung that, among all rungs that have associated producers, has the lowest associated threshold.

Among those embodiments that feature an arbiter are those in which the arbiter responds to a dynamically changing relationship between a threshold and the penalty values and causes a change in that the relationship in response to the occurrence of a condition that depends on the relationship. In these embodiments, packet producers are divided among upper and lower rungs of a penalty ladder, with each rung having an associated threshold. Among these are embodiments in which the arbiter causes penalty values that are greater than the threshold to become less than the threshold. In some embodiments, this is carried out by causing penalty values that are greater than the threshold to become less than the threshold by increasing the threshold, or alternatively, by subtracting a value from the penalty values. Subtraction can be carried out in various ways. For example, when each penalty value is represented in binary by a fixed number of bits, the arbiter can subtract a value by clearing the most significant bit in the string of bits. As another example, the arbiter subtracts a selected value, such as the threshold itself, from the penalty values. In other examples the selected value is a value other than the threshold.

In some embodiments, the packet producers are dynamically divided among rungs of a penalty ladder based on accumulated penalties of each of the packet producers. These embodiments include circuitry for identifying a next packet producer to be serviced. Such circuitry includes a set of first fixed-priority arbiters and a second fixed-priority arbiter. The second fixed-priority arbiter includes a plurality of inputs. Each of the first fixed-priority arbiters corresponds to one of the inputs. These embodiments include those in which the number of inputs is one more than the number of rungs in the penalty ladder, as well as those in which the number of inputs is less than or equal to twice the number of rungs in the penalty ladder.

Alternative embodiments that include an arbiter are those in which the arbiter allocates service among packet producers based on a load ratio. In these embodiments, the first and second packet producers have corresponding average loads. A ratio of these loads defines a load ratio. The arbiter then allocates service between the first and second packet producers based on this load ratio. In particular, the arbiter allocates service between the first and second packet producers such that a ratio of service provided between the first and second packet producers is the same as the load ratio.

In other embodiments that include an arbiter, the first and second packet producers have corresponding first and second designated service levels. These service levels define a service ratio. The arbiter allocates service between the first and second packet producers such that a ratio of service provided between the first and second packet producers is the same as the service ratio.

In another embodiment, the penalty value assessed against the first packet producer is inversely proportional to an expected extent to which the first packet producer requires service. Similarly, the penalty value assessed against the second packet producer is inversely proportional to an expected extent to which the second packet producer requires service. In another embodiment, packet producers that require the most service incur the smallest penalty values.

Other embodiments feature first and second penalty accumulators corresponding to the first and second packet producers. In these embodiments, the penalizer is configured to accumulate penalties for the first and second packet producers in the corresponding first and second penalty accumulators.

In other embodiments, the penalizer assesses a penalty value against the first packet producer. This penalty value depends at least in part on a traffic pattern associated with a data packet associated with the first packet producer. Among these embodiments are those in which the penalizer inspects a data packet and determines, based on information in the data packet, a traffic pattern associated with the data packet.

Also among the embodiments are those in which the router has at least one output port and the penalizer is associated with this output port.

In another aspect, the invention features an apparatus comprising a data communication system that comprises a set of competitors, and a finite resource that provides a service that is required by the competitors for carrying out data communication. The data-communication system allocates this finite resource among the competitors. Each competitor comprises a source of data that is to be communicated using the finite resource. Each competitor also has a corresponding expectation. This expectation indicates an extent to which the competitor is expected to require service from the resource. The system further includes an arbiter, a penalizer, and a plurality of penalty accumulators, each of which corresponds to one of the competitors. The arbiter schedules the competitors for receiving service from the resource. The penalizer penalizes a competitor for requesting access to the resource. In particular, in response to receiving a request from a particular competitor for service by the finite resource, the penalizer assesses a penalty. The extent of that penalty is inversely related to the expectation. For each competitor, the penalizer accumulates penalties for that competitor in that competitor's corresponding penalty accumulator. The penalty accumulators are dynamically assigned to rungs of the penalty ladder. Each rung has an assigned range of accumulated penalty values. The penalty accumulators transition among the rungs based on changes to accumulated penalty values stored therein. The arbiter services competitors assigned to a lower rung before servicing competitors on a higher rung. Within a rung that is being serviced, the arbiter executes a round robin to service competitors assigned to the rung.

In some embodiments, the competitors comprise sources of units of information. Among these are embodiments in which the units of information comprise data packets and those in which they comprise datagrams.

In those embodiments in which the competitors comprise sources of information units, the sources can include routers, computational elements, and/or communication channels.

Some embodiments also include a router that has at least one output port. In these embodiments, the finite resource is that output port.

Also among the embodiments are those in which the resource and the competitors are implemented on a common chip, and those in which the resource and the competitors are implemented on plural chips.

Yet other embodiments include hardware configured to implement a molecular-dynamics simulation system for simulating states of bodies in a simulation volume that is divided into a plurality of simulation regions. Such hardware includes a plurality of nodes, and an off-chip network that interconnects the nodes. Each node simulates states of bodies within a particular simulation region of the simulation volume. Each node includes a chip that has multiple cores and an on-chip network that interconnects the multiple cores. The on-chip network includes a plurality of on-chip routers, each of which has at least one output port. The arbiter, penalizer, penalty accumulator, and penalty ladder are associated with an output port of one of these on-chip routers.

An advantage of one or more embodiments is that the arbitration approach at a router can be implemented with relatively simple hardware, for example, without the complexity of monitoring backlogs of packets, because the target number or rate of packets to pass through via the router are known in advance.

DESCRIPTION OF THE FIGURES

These and other features of the invention will be apparent from the following detailed description and the accompanying figures, in which.

DETAILED DESCRIPTION

The invention concerns the management of competition by several entities for a particular finite resource. In certain embodiments described herein, the finite resource is access to a particular one of the one or more output ports of a router. However, the subject matter described herein is applicable to competition for any finite resource, including, without limitation, competition for memory locations, competition for ports used to read from and write to memory locations, and competition for inter-router channels.

The competing entities are producers of data packets. Each competing entity would like to provide a sequence of these packets to the router, where the sequence of packets can include one or more data packets. Ideally, as each packet from a sequence arrives, the router would immediately forward that packet to a particular output port of the router. Unfortunately for the competing entity, there may be many other competing entities, all of which are providing packets to the router for further delivery through the designated port.

The packet producers can be, without limitation, other routers, computational elements, or communication channels, whether they are implemented on the same chip or on different chips. Common to all such producers is that they produce units of information, such as data packets, that need routing to a destination.

Figure 1:
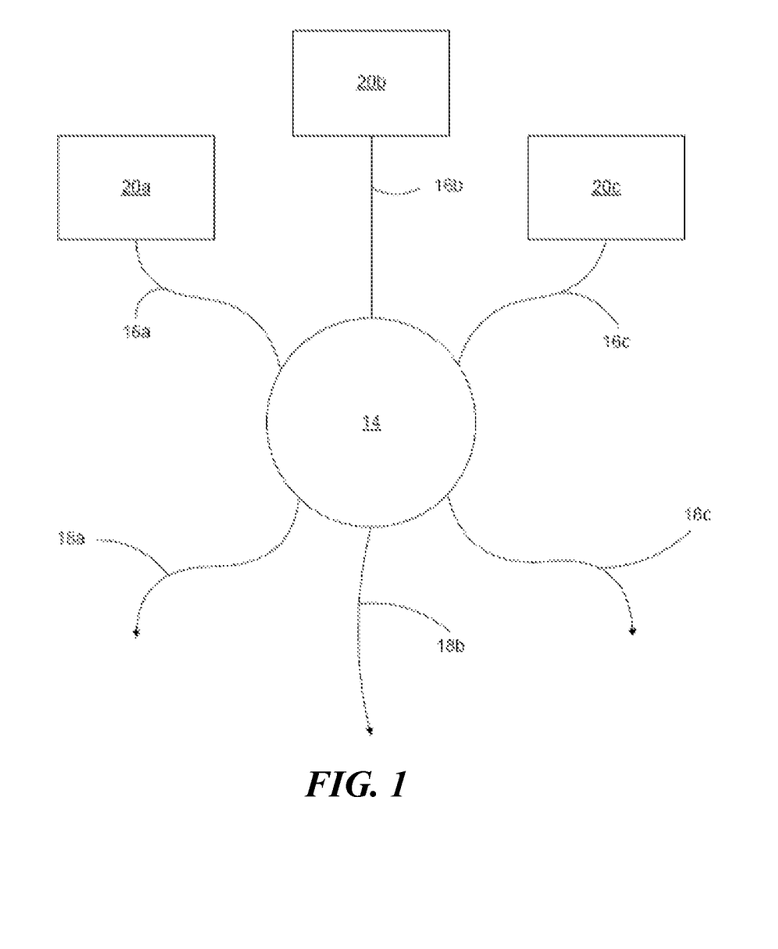
FIG. 1 shows information producers connected to a router.

FIG. 1 shows a router 14 having a plurality of input ports 16a, 16b, 16c and a plurality of output ports 18a, 18b, 18c. Although only three input ports and three output ports are shown, it is understood that this is only by way of example, and that in general a router can have m input ports and n output ports, where m and n are positive integers.

Three producers 20a, 20b, 20c are in data communication with the router 14. Although three producers are shown, it is understood that this is only by way of example, and that in general there can be k producers, where k is a positive integer greater than 1. For ease of exposition, and without loss of generality, the invention as shown in FIG. 1 will be described for the case in which k=3. However, the principles described herein are easily extended to other values of k.

When traffic is light, there is no backlog of packets waiting to pass through the router 14. In that case, when the router 14 receives a packet from a producer 20a-20c, it inspects the packet to see where it is going. Having done so, it then forwards it immediately out the correct output port 18a-18c.

However, sometimes a router 14 develops a backlog of packets to be delivered. In that case, to the extent the producers 20a-20c each provide packets that are ultimately to be forwarded through a particular router output (for example, output port 18b), they become competing entities. The resource being competed for is the access to that output port 18b. The router 14 must therefore somehow determine, for instance, an order in which it should forward packets from the producers 20a-20c.

In some applications, the router 14 is part of a network that is used in connection with one or more known computational tasks. Each such computational task gives rise to a characteristic data traffic pattern that is known in advance, for example by having been simulated.

For example, in one embodiment, which involves a simulation of molecular dynamics, different processing elements are assigned to carry out computations associated with different volumes of space. These processing elements must sometimes communicate with each other, generally through a network having routers, such as the router 14 shown in FIG. 1.

However, because the types of interactions are known in advance in such an embodiment, it is possible to predict traffic patterns among processing elements, and hence between the producers 20a-20c and the router 14, with reasonable accuracy once the particular computational task is known. For example, the total number of packets, or an average rate of packets per unit time, that a router will receive from each producer 20a-20c connected to its input ports 16a-16c is known or approximately known for each of the computation tasks.

Advance knowledge of this characteristic data traffic pattern can be exploited for allocation of the particular router's attention among the competing producers 20a-20c.

Figure 2:
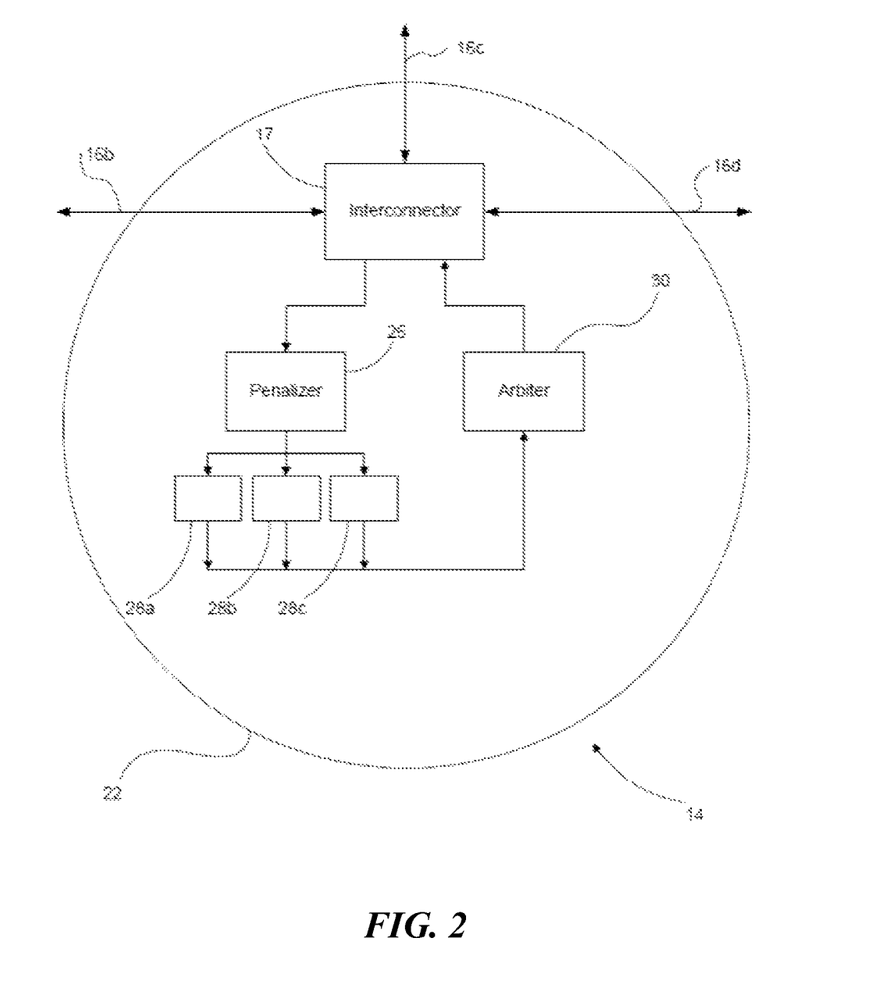
FIG. 2 shows an arbiter corresponding to one of the output ports in the router shown in FIG. 1.

FIG. 2 shows circuitry 22 associated with a particular output port 18b for managing the way access to the output port 18b is shared among producers 20a-20c. The remaining output ports 18a, 18c have similar circuitry that operates in the same way. Accordingly, only the circuitry for the particular output port 18b is described in detail.

An interconnector 17 mediates communication with the producers 20a-20c and updates a penalizer 26 that tracks the service history of each producer 20a-20c. To do so, the penalizer 26 maintains penalty accumulators 28a-28c for each producer 20a-20c that is capable of using the port 18b. Each penalty accumulator 28a-28c has a value indicative of an extent to which its corresponding producer 20a-20c has received attention. Thus, for example, each time a producer 20a provides a data packet to be routed through the output port 18b, the penalizer 26 updates the penalty accumulator 28b for that producer 20a.

As a result, at any instant, an arbiter 30 associated with a particular output port 18b can determine, for example, which of the producers 20a-20c has received the most or the least attention. To decide which producer 20a-20c to service next, the arbiter 30 inspects its penalty accumulators 28a-28c and identifies a penalty accumulator 28c that, at that instant, has a lower penalty value than other penalty accumulators.

In one embodiment, the arbiter 30 identifies the penalty accumulator 28a-28c having the lowest penalty value and then preferentially services the producer 20a-20c corresponding to that penalty accumulator 28a-28c.

Figure 3:
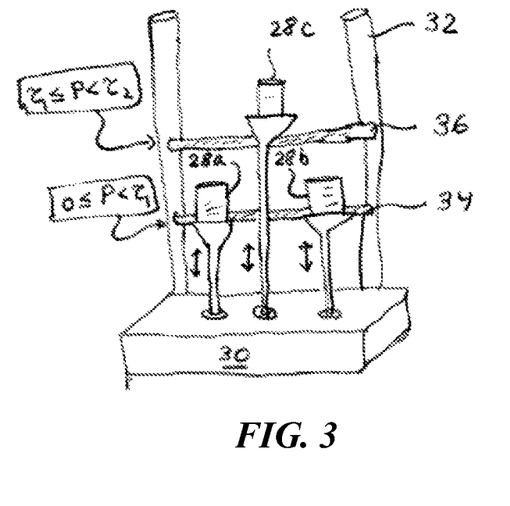
FIG. 3 shows a two-rung penalty ladder.

In another embodiment, shown in FIG. 3, the arbiter 30 defines what is referred to herein as a penalty ladder 32 having a lower rung 34 and an upper rung 36. In these embodiments, the arbiter 30 moves penalty accumulators 28a-28c between the lower rung 34 and the upper rung 36 dynamically, based on a current penalty value in the penalty accumulator 28a-28c. Each rung 34, 36 represents a particular priority level. As a result, a penalty accumulator 28c in the upper rung 36 currently has a penalty value above some threshold, and penalty accumulators 28a, 28b in the lower rung 34 are those that currently have a penalty value below that threshold. The arbiter 30 preferentially services producers 20a, 20b that have penalty accumulators 28a, 28b in the lower rung 34.

Thus, in the embodiment illustrated in FIG. 3, the arbiter 30 services the needs of first and second producers 20a, 20b before servicing the needs of the third producer 20c because the third producer 20c has already had its share of attention from the arbiter 30, as evidenced by the fact that its associated penalty accumulator 28c is on the upper rung 36 of the penalty ladder 32. Within a particular rung 34, the arbiter 30 uses round-robin arbitration to service the producers 20a, 20b that have penalty accumulators 28a, 28b on that rung 34.

Figure 4:
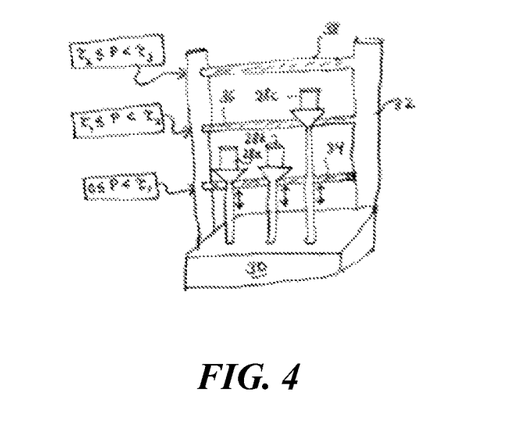
FIG. 4 shows a three-rung penalty ladder.

In yet another embodiment, shown in FIG. 4, the arbiter 30 defines a "penalty ladder" 32 having a plurality of rungs 34, 36, 38 each of which corresponds to one of a corresponding plurality of thresholds. The arbiter 30 then moves penalty accumulators 28a-28c between these rungs 34, 36, 38 dynamically based on a current penalty value in the penalty accumulator 28a-28c. As a result, penalty accumulators 28a-28b on a particular rung 34 will be those that have a penalty value that is within the range of penalty values associated with that rung 34.

The thresholds associated with the penalty ladder 32 are strictly increasing, meaning that the penalty values associated with the lowest rung 34 of the plurality of rungs 34, 36, 38 are the smallest, the penalty values associated with the next lowest rung 36 are the second smallest, and so on, through the uppermost rung 38, which has the highest penalty values associated with it.

In the illustrated embodiment, there are three such rungs 34, 36, 38. In this embodiment, the arbiter 30 preferentially services producers 20a, 20b whose corresponding penalty accumulators 28a, 28b are on the rung 34 that has the lowest penalty value among those rungs 34, 36.

Embodiments in which penalty accumulators 28a-28c are distributed among rungs 34, 36, 38 of a penalty ladder 32, as described above, and in which a round-robin arbitration scheme is applied within one or more of those rungs 34, 36, 38, are particularly advantageous because it is expensive to implement hardware that can find the actual lowest penalty value among all penalty accumulators 28a-28c.

In the case of the two-rung penalty ladder 32 shown in FIG. 3, the arbiter 30 preferentially services those producers 20a, 20b that have their associated penalty accumulators 28a, 28b in the lower rung 34. One way to do this is to implement round-robin arbitration among the producers 20a, 20b, and to service producers 28c that have their penalty accumulators in the upper rung (also using round-robin arbitration among the corresponding producers) only when there are no service requests from producers 20a, 20b having their penalty accumulators 28a, 28b in the lower rung 34.

In the case in which the penalty ladder has three or more rungs, the arbiter 30 preferentially services penalty accumulators in the lowest rung that has penalty accumulators in it, and then services penalty accumulators in each of the next highest rungs with penalty accumulators in them in order of lowest rung to highest rung. When there are no requests from producers corresponding to penalty accumulators in a particular rung of the penalty ladder, the arbiter 30 then proceeds to the rung immediately above the particular rung. For example, if the arbiter 30 has determined that there are no requests from producers having penalty accumulators at rung n, it proceeds to rung n+1. Having arrived at rung n+1, the arbiter determines whether there are any requests for service. If the answer is "yes," the arbiter 30 proceeds to service them. If the answer is "no," the arbiter 30 proceeds to the next higher rung, which would be rung n+2, and repeats the procedure. In this way, the arbiter 30 climbs the penalty ladder 32 and services requests from producers as it encounters penalty accumulators associated with those producers on its climb.

It should be noted that every time a producer 20a-20c submits a data packet to be routed, its corresponding penalty accumulator 28a-28c receives some penalty. Therefore, in the long run, as long as its associated producer remains active by continuing to submit data packets, every penalty accumulator 28a-28c will eventually climb out of the lowest rung. This means that, in the long run, the particular router 14 will have serviced all active producers 20a-20c connected to it for long enough so that the penalty values stored in the penalty accumulators 28a-28c associated with these producers 20a-20c have all risen above a maximum penalty value associated with the lowest rung. In response, the arbiter 30 increases the value of the threshold associated with each of the active producers 20a-20c. In another embodiment, which is preferable since the number space is finite, the arbiter 30 subtracts the threshold value from each of the penalty values associated with each of the active producers 20a-20c. However, the penalty values associated with non-active producers remain unchanged.

In either case, the effect is the same. The arbiter 30 causes a change in the relationship between the threshold value and the penalty values associated with the active producers 20a-20c. When a request is received from an active producer 20a, the arbiter 30 checks for the presence of any active producers in a rung that is lower than the rung of the active producer 20a. In particular, the arbiter 30 checks to see if there are any requests from any producers that are in a rung that is lower than the rung of the active producer 20a from which the request has been received. If there are no such producers, then a fixed amount is subtracted from all penalty values associated with producers in the rung of the active producer, and all penalty values associated with producers in all higher rungs. Penalty values associated with producers in lower rungs are left unchanged. For certain choices of the fixed amount to subtract and the thresholds of the rungs, this has the effect of moving all active producers to the next lower rung. In this manner, penalty values are prevented from growing beyond the threshold of the uppermost rung.

Subtraction can be carried out in several ways. In some embodiments, when the penalty values are represented as unsigned $(n+1)$-bit integers, and the maximum penalty value of the lower rung is $2^n-1$, a particularly efficient way to carry out the subtraction is to simply clear the most significant bit of each penalty value, regardless of whether the penalty value is in the upper rung or the lower rung.

As noted above, it is particularly desirable to keep penalty values associated with less active producers unchanged. Ordinarily, one might expect that if the same operation is applied to all penalty values, then all penalty values will be affected in some way. However in this case, the operation affects only those penalty values in the upper rung. There is no effect on penalty values in the lower rung.

For those penalty values that are in the upper rung, clearing the most significant bit amounts to subtracting $2^n$ from each penalty value, thus bringing those penalty values into the lower rung. However, for those penalty values that are in the lower rung, the most significant bit is already zero. Therefore, clearing the most significant bit has no effect on those penalty values. This method is particularly advantageous because clearing the most significant bit in a way that does not discriminate based what rung the penalty value is on is easily implemented in hardware and can be executed rapidly.

In other embodiments, one can use a hardware subtraction module to subtract any number. A suitable choice of number for subtraction is the lowest threshold in the ladder, since all penalty accumulators that have climbed out of the lowest rung will have a penalty value greater than this threshold.

The penalizer 26 associated with a particular output port 18b updates a penalty accumulator 28a-28c by incrementing the penalty value by a known penalty each time the particular router 14 services that penalty accumulator's corresponding producer 20a-20c. The penalty, however, is not necessarily the same for all penalty accumulators 28a-28c. In general, the penalty used for incrementing a value in a penalty accumulator 28a-28c depends on an expected number of packets that are to pass from that penalty accumulator's associated producer 20a-20c. This expected load can be obtained in advance by a variety of methods, of which one example is off-line simulation of traffic patterns.

Thus, a producer 20a that is expected to be busy receives only a small penalty whenever the particular router 14 services it. A producer 20c that is not expected to be so busy receives a bigger penalty whenever the particular router 14 services it.

In one embodiment, the penalizer 26 assesses, against a producer 20b, a penalty that is inversely proportional to the expected usage by that producer 20b under an incumbent traffic pattern. In that case, the penalty value stored in the penalty accumulator 28b at any time would be the total number of packets received from that producer 20b divided by the average load for that producer 20b. In particular, the penalty value $A_i(t)$ that is stored in the penalty accumulator 28b associated with the $i^{th}$ producer 20b at time t is given by $S_i(t)/\gamma_i$, where $S_i(t)$ is the total number of packets serviced by the router 14 on behalf of the $i^{th}$ producer 20b at or before time t, and $\gamma_i$ is the average load resulting from the $i^{th}$ producer 20b.

In such a case, the ratio of service provided between any two producers 20a, 20b will be the same as the ratio of their average loads $\gamma_i/\gamma_j$.

The foregoing description assumes that the traffic patterns are static. In other words, the various computational elements are simply doing the same thing over and over again. As a result, the traffic pattern never changes.

In some embodiments, the computational elements that use the network described herein will switch between different computational tasks, each of which has its own characteristic traffic pattern. A change to a different computational task thus results in a change to the traffic pattern. This means the traffic pattern changes with time. As a result, a first producer 20b that was the busiest producer during one computational task may find itself less busy, and a second producer 20c that was formerly somewhat idle may find itself working much harder. In that case, it would not be fair for the penalizer 26 to continue to assess a high penalty for the second producer 20c and a lower penalty for the first producer 20b.

To address this unfairness, it is useful for the penalizer 26 to assess a penalty based not only on the identity of the producer 20a-20c but also on the particular traffic pattern associated with data packets provided by that producer 20a-20c.

To implement this, it is useful to provide the penalizer 26 with information concerning the particular traffic pattern associated with a data packet from a producer 20a-20c.

One way to do this is to include such information in data packets received by the router 14. The penalizer 26 can then inspect a data packet to determine not only the associated producer 20a-20c but the particular task, and hence the traffic pattern, associated with that data packet.

In some embodiments, multiple traffic patterns are present at the same time rather than at different times. In such cases, the approach of applying traffic-pattern-dependent penalties continues to provide the desired result of fairness for each of the traffic patterns.

When multiple traffic patterns are concurrently present, the value of a penalty accumulator 28b at any time would be the total number of packets serviced on behalf of a particular producer 20b under a first traffic pattern divided by the average load associated with that producer 20b in that first traffic pattern added to the total number of packets serviced on behalf of that producer 20b under a second traffic pattern divided by the average load associated with that producer 20b in that second traffic pattern. In particular, the penalty value $A_i(t)$ that is stored in the penalty accumulator 28b associated with the $i^{th}$ producer 20b at time t is given by:

$$A_i(t) = \sum_{n=0}^{N-1} s_{i,n}(t)/\gamma_{i,n},$$

where the summation is carried out over all N traffic patterns, $s_{i,n}(t)$ is the total number of packets serviced on behalf of the $i^{th}$ producer under the $n^{th}$ traffic pattern at or before time t, and $\gamma_{i,n}$ is the average load associated with the $i^{th}$ producer under the $n^{th}$ traffic pattern.

The result is an effective traffic pattern formed by blending two or more traffic patterns with the weights associated with each traffic pattern in the blended mixture being proportional to the extent to which the system 10 engages in the computational task associated with that traffic pattern. This is summarized by the following equation for the effective load associated with the $i^{th}$ producer.

$$\overline{\gamma}_i = \sum_{n=0}^{N-1} \alpha_n \gamma_{i,n},$$

where the $\alpha_n$ are mixing coefficients that sum to unity and that describe the fraction of traffic belonging to each traffic pattern, and $\gamma_{i,n}$ is the average load associated with the $i^{th}$ producer under the $n^{th}$ traffic pattern.

With K producers, some of which have requests, and N priority levels, or penalty rungs as used herein, where lower rungs have higher priority, a goal is to select a producer with a request at the highest possible priority level, using round-robin arbitration within a priority level when there are multiple producers with requests at that priority level. One way to implement this is to define P[k] as the priority level of the $k^{th}$ producer, to define R[k] as 1 if the $k^{th}$ producer has a request and 0 otherwise, and to define r as a round-robin pointer indicating that, within a priority level, the producers are given preference in the order r, r+1, r+2, . . . , K−1, 0, 1, . . . , r−1. With these definitions in place, a producer can be chosen as follows:

```
For n = N-1, ..., 0
    For k=r, ... K-1
        if P[k] == n and R[k]==1 then
            pick k
            goto Done
    For k=0,...r-1
        if P[k] == n and R[k]==1 then
            pick k
            goto Done
Done:
```

This can be implemented using a priority encoding approach using K-bit vectors, V1 and V2, in which the $0^{th}$ bit is at the far left and the $(K-1)^{th}$ bit is at the far right:

```
For n = N-1, ..., 0
    V1[k] = 1 if k>=r && P[k] == n and R[k]
    V1[k]=0 otherwise
    If V1<> 0 then
        pick k as leftmost bit position of a 1 in
            V1, i.e. the smallest k such that V1[k] = 1
        goto Done
    V2[k] = 1 if k<r && P[k] == n and R[k]
    V2[k]=0 otherwise
    If V2 <> 0 then
        pick k as leftmost bit position of a 1
            in V2, i.e. the smallest k such that
            V2[k] = 1
        goto Done
Done:
```

Each of the "Pick k" operations is implemented using a fixed-priority arbiter. Using the above method requires N operations for the first conditional statement and another N operations for the second conditional statement. As a result, the foregoing implementation requires 2N operations. A hardware implementation of the foregoing method would therefore require circuitry for 2N fixed-priority arbiters.

In addition, the "goto Done" operation is implemented using another fixed-priority arbiter. As a result, the hardware implementation requires circuitry for a 2N-input fixed-priority arbiter to select among the results of the fixed-priority arbiters.

An equivalent operation requires only (N+1) operations instead of 2N operations. This equivalent operation can be expressed using a K-bit vector V as

```
V[k] = 1 if k>=r && P[k] == N-1 and R[k]
V[k] = 0 otherwise
If V<> 0 then
    pick k as leftmost bit position of a 1 in V
    goto Done
For = N-2, ..., 0
    V[k] = 1 if k<r && P[k] == (n+1) and R[k]
    V[k] = 1 if k>=r && P[k] == n and R[k]
    V[k] = 0 otherwise
    If V<> 0 then
        pick k as leftmost bit position of a 1 in V
        goto Done
V[k] = 1 if k<r && P[k] == 0 and R[k]
V[k] = 0 otherwise
If V<> 0 then
    pick k as leftmost bit position of a 1 in V
    goto Done
Done:
```

In the foregoing implementation, the for-loop requires N−1 operations. Finding the leftmost set-bit in the vector then requires two additional operations. This results in only N+1 operations. The hardware implementation of the foregoing procedure results in only (N+1) fixed-priority arbiters and one (N+1)-input fixed-priority arbiter.

An inverse weighted arbiter as described above is particularly useful in a massively parallel special-purpose supercomputer formed from a network of nodes, each of which has multiple cores on one chip that are linked by a high-performance tightly-coupled on-chip network. Such a data processing system, which can be used, for example, for simulation of molecular dynamics, is effectively a network of networks.

Figure 5:
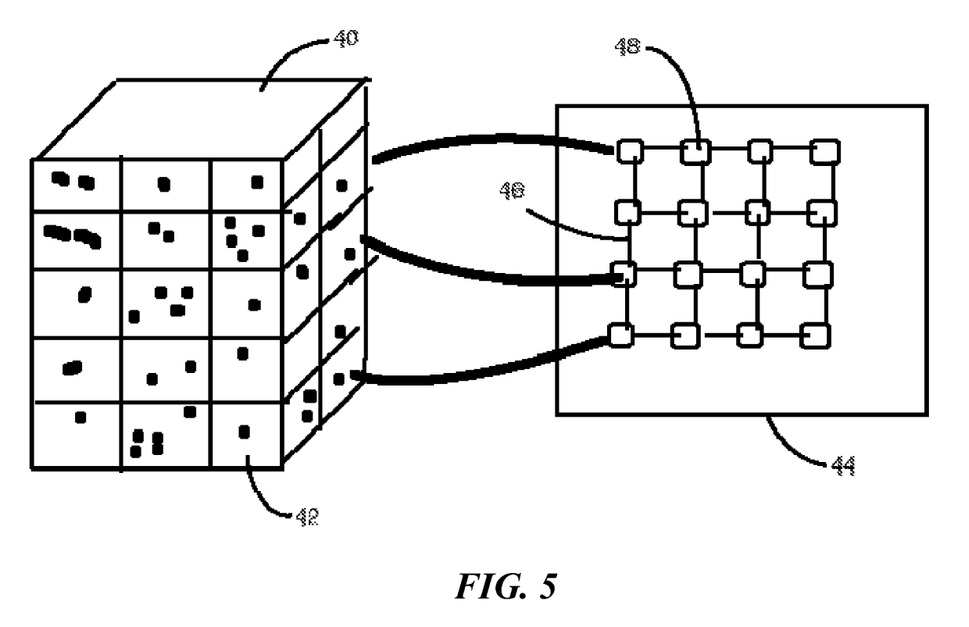
FIG. 5 shows a molecular-dynamics simulation system having nodes, each of which implements inverse-weighted arbitration using arbiters as shown in FIG. 2.

FIG. 5 shows a simulation volume 40 that is partitioned into simulation regions 42, each of which contains a distribution of bodies, such as atoms or molecules. A molecular dynamics simulator 44 includes a network 46 that interconnects a large number of nodes 48. Each node 48 is responsible for simulation of changes in position and velocity of bodies in a particular simulation region 42. Such a simulator 44 is an example of a massively parallel special-purpose supercomputer as described above. In this example, a router 14 is associated with each one of the nodes 48. Nodes adjacent to a particular node 48 would then correspond to some producers 20a-c. Each node contains within it multiple cores an on-chip network interconnecting the cores. Thus, producers 20a-c can also correspond to neighboring cores on the on-chip network.

Having described the invention, and a preferred embodiment thereof, what we claim as new, and secured by Letters Patent is:

1. An apparatus for data communication, said apparatus comprising a router, a plurality of data-packet producers, each of which provides a sequence of data packets to an input of said router, each data packet requiring inspection to identify a destination thereof followed by forwarding to a correct output port of said router, and a penalizer, wherein said plurality of packet producers comprises a first packet producer and a second packet producer, wherein said router is directly connected to said first packet producer, wherein said router is directly connected to said second packet producer, wherein said penalizer is configured to assess a first penalty against said first packet producer when said router services said first packet producer, wherein said first penalty that is assessed by said penalizer against said first packet producer has a penalty value that is inversely proportional to an expected usage by said first packet producer under an incumbent traffic pattern, said expected usage by said first packet producer having been determined based on advance knowledge of said incumbent traffic pattern, wherein said penalizer is further configured to assess a second penalty against said second packet producer when said router services said second packet producer, wherein said second penalty that is assessed by said penalizer against said second packet producer has a penalty value that is inversely proportional to an expected usage by said second packet producer under said incumbent traffic pattern, an expected extent to which said second packet producer requires service, said expected usage by said second packet producer having been determined based on said advance knowledge of said incumbent traffic pattern, wherein said penalizer is further configured to combine said first penalty with an accumulated penalty for said first packet producer, wherein said penalizer is further configured to combine said second penalty with an accumulated penalty for said second packet producer, wherein the apparatus further comprises an arbiter, wherein said arbiter is configured to award priority to a packet producer based at least in part on said accumulated penalty for said first packet producer and on said accumulated penalty for said second packet producer, wherein said packet producers are divided among upper and lower rungs of a penalty ladder, wherein a packet producer is on said upper rung if an accumulated penalty associated with said producer is in excess of a threshold, wherein a packet producer is on said lower rung if an accumulated penalty associated with said producer is less than said threshold, and wherein said arbiter is configured to award priority to a producer on said lower rung when possible.

2. The apparatus of claim 1, further comprising a network in which said data communication takes place.

3. The apparatus of claim 2, wherein said network is integrated into a chip.

4. The apparatus of claim 1, wherein said packet producers are divided among at least three rungs of a penalty ladder, each of which is associated with a range of penalty values, wherein a packet producer is on a particular rung if an accumulated penalty associated with said producer is within a range of penalty values associated with said particular rung, wherein said arbiter is configured to preferentially service penalty accumulators in the lowest rung that has penalty accumulators in it, and to then service penalty accumulators in each of the next highest rungs with penalty accumulators in them in order of lowest rung to highest rung.

5. The apparatus of claim 4, wherein each rung has an associated threshold, and wherein said arbiter uses round-robin arbitration to select a particular producer from among a plurality of producers on a rung that, among all rungs that have associated producers, has the lowest associated threshold.

6. The apparatus of claim 1, wherein said packet producers are divided among upper and lower rungs of a penalty ladder, wherein each rung has an associated threshold, and wherein said arbiter is configured to observe a dynamically changing relationship between said threshold and said penalty values and to cause a change in said relationship in response to the occurrence of a condition that depends on said relationship.

7. The apparatus of claim 6, wherein said arbiter is configured to cause penalty values that are greater than said threshold to become less than said threshold.

8. The apparatus of claim 7, wherein said arbiter is configured to cause penalty values that are greater than said threshold to become less than said threshold by increasing said threshold.

9. The apparatus of claim 7, wherein said arbiter is configured to cause penalty values that are greater than said threshold to become less than said threshold by subtracting a value from said penalty values.

10. The apparatus of claim 9, wherein each penalty value is represented in binary by a fixed number of bits, and wherein said arbiter is configured to subtract a value by clearing a most significant bit in said string of bits.

11. The apparatus of claim 9, wherein said arbiter is configured to subtract a selected value from said penalty values.

12. The apparatus of claim 11, wherein said selected value that is subtracted from said penalty values is said threshold.

13. The apparatus of claim 1, wherein said arbiter is configured to cause penalty values that are greater than a threshold to become less than said threshold when a request has been received from a producer having a penalty accumulator whose value is above the threshold but no request has concurrently been received from a producer having a penalty accumulator whose value is below the threshold.

14. The apparatus of claim 1, wherein said packet producers are dynamically divided among rungs of a penalty ladder based on accumulated penalties of each of said packet producers, wherein said apparatus further comprises circuitry for identifying a next packet producer to be serviced, wherein said circuitry comprises a set of first fixed-priority arbiters and a second fixed-priority arbiter, wherein said second fixed-priority arbiter comprises a plurality of inputs, and wherein each of said first fixed-priority arbiters corresponds to one of said inputs.

15. The apparatus of claim 14, wherein the number of inputs is one more than the number of rungs in said penalty ladder.

16. The apparatus of claim 14, wherein the number of inputs is less than or equal to twice the number of rungs in said penalty ladder.

17. The apparatus of claim 1, further comprising an arbiter, wherein said first packet producer has an average load, wherein said second packet producer has an average load, wherein a ratio of said average load of said first packet producer and said average load of said second packet producer defines a load ratio, and wherein said arbiter is configured to allocate service between said first and second packet producers such that a ratio of service provided between said first and second packet producers is the same as said load ratio.

18. The apparatus of claim 1, further comprising an arbiter, wherein said first packet producer has a first designated service level, wherein said second packet producer has a second designated service level, wherein said first and second designated service levels define a service ratio, and wherein said arbiter is configured to allocate service between said first and second packet producers such that a ratio of service provided between said first and second packet producers is the same as said service ratio.

19. The apparatus of claim 1, further comprising first and second penalty accumulators corresponding to said first and second packet producers, wherein said penalizer is configured to accumulate penalties for said first and second packet producers in said first and second penalty accumulators.

20. The apparatus of claim 1, wherein said penalizer is further configured to assess a penalty value against said first packet producer, wherein said penalty value depends at least in part on a traffic pattern associated with a data packet associated with said first packet producer.

21. The apparatus of claim 20, wherein said penalizer is configured to inspect a data packet and to determine, based on information in said data packet, a traffic pattern associated with said data packet.

22. The apparatus of claim 1, wherein said router comprises at least one output port, and said penalizer is associated with said at least one output port.

23. The apparatus of claim 1, wherein said incumbent traffic pattern is a static traffic pattern.

24. The apparatus of claim 1, wherein said incumbent traffic pattern changes over time.

25. The apparatus of claim 1, wherein under said incumbent traffic pattern, said first packet-producer has a higher expected usage than said second packet-producer, wherein said router services said first and second packet-producers and assesses a first penalty against said first packet-producer and a second penalty against said second packet-producer, and wherein said first penalty is lower than said second penalty.

26. The apparatus of claim 1, wherein for each packet producer, a penalty associated with said packet producer is given by a total number of data packets received from said packet producer divided by an average load for said packet producer.

27. The apparatus of claim 1, wherein said first packet producer operates under one of a plurality of traffic patterns, wherein a penalty associated with said first packet producer is equal to a summation of a plurality of terms, each of which corresponds to one of said plurality of traffic patterns, wherein each term is given by a total number of data packets received from said packet producer under a traffic pattern associated with said term divided by an average load for said packet producer under said traffic pattern associated with said term.

28. The apparatus of claim 1, wherein said incumbent traffic pattern is an effective traffic pattern formed by blending two or more traffic patterns with corresponding associated weights.

29. An apparatus comprising a data communication system that comprises a set of competitors, each of which is a source of a sequence of data packets, each of which requires inspection to identify a destination thereof, and a finite resource that provides a service that is required by said competitors for carrying out data communication, said service including receiving said sequence of data packets, said data-communication system being configured for allocating said finite resource among said competitors, wherein said sequences of data packets are to be communicated using said finite resource, wherein each competitor has a corresponding expected usage under an incumbent traffic pattern, said expected usage being indicative of an extent to which said competitor is expected to require service from said resource, wherein said data-communication system further comprises an arbiter for scheduling said competitors for receiving service from said resource, a penalizer for penalizing a competitor for requesting access to said resource, and a plurality of penalty accumulators, each of which corresponds to one of said competitors, wherein said penalizer is configured to assess, for each of said competitors, in response to receiving, from said competitor, a request for service by said resource, a penalty that is inversely proportional to said expected usage, wherein, for each competitor, said penalizer accumulates penalties in a penalty accumulator corresponding to said competitor, wherein said penalty accumulators are dynamically assigned to rungs of a penalty ladder, each of said rungs having an assigned range of accumulated penalty values, wherein said penalty accumulators transition among said rungs based on changes to accumulated penalty values stored therein, wherein said arbiter is configured to service competitors assigned to a lower rung before servicing competitors on a higher rung, and wherein, within a rung that is being serviced, said arbiter executes a round robin to service competitors assigned to said rung.

30. The apparatus of claim 29, wherein said competitors comprise routers.

31. The apparatus of claim 29, wherein said competitors comprise computational elements.

32. The apparatus of claim 29, wherein said competitors comprise communication channels.

33. The apparatus of claim 29, further comprising a router having at least one output port, wherein said resource comprises said at least one output port.

34. The apparatus of claim 29, wherein said resource and said competitors are implemented on a common chip.

35. The apparatus of claim 29, wherein said resource and said competitors are implemented on plural chips.

36. The apparatus of claim 29, further comprising hardware configured to implement a molecular-dynamics simulation system for simulating states of bodies in a simulation volume that is divided into a plurality of simulation regions, said hardware comprising a plurality of nodes, and an off-chip network, wherein said off-chip network interconnects said nodes, wherein each of said nodes is configured to simulate states of bodies within a particular simulation region of said simulation volume, wherein each of said nodes comprises a chip, wherein said chip comprises multiple cores and an on-chip network, wherein said on-chip network interconnects said multiple cores on said chip, wherein said on-chip network comprises a plurality of on-chip routers, each of which has at least one output port, and wherein said arbiter, said penalizer, said penalty accumulator, and said penalty ladder are associated with an output port of one of said on-chip router.

\* \* \* \* \*